United States Patent [19]
Palmer et al.

[11] Patent Number: 5,902,101
[45] Date of Patent: May 11, 1999

[54] TORCH

[75] Inventors: Roger Palmer, Lockport; Mike Ridley, Holley; Al Hyde, Byron, all of N.Y.

[73] Assignee: Newell Operating Company, Freeport, Ill.

[21] Appl. No.: 08/876,871

[22] Filed: Jun. 16, 1997

[51] Int. Cl.⁶ ....................................................... F23D 5/02
[52] U.S. Cl. ......................... 431/202; 431/344; 431/343; 431/353; 362/431; 126/255
[58] Field of Search ..................... 431/344, 353, 431/343, 202; 126/255; 362/431

[56] References Cited

U.S. PATENT DOCUMENTS

| | | | |
|---|---|---|---|
| 2,564,371 | 8/1951 | Parsberg | 431/355 |
| 3,721,516 | 3/1973 | Reese | 431/344 |
| 4,904,182 | 2/1990 | Leshner | 431/355 |
| 5,016,611 | 5/1991 | Lai | 126/255 |
| 5,083,916 | 1/1992 | Glennon | 431/344 |

*Primary Examiner*—Carroll B. Dority
*Attorney, Agent, or Firm*—Foley & Lardner

[57] ABSTRACT

A torch suitable for use in recreational applications, such as with patios or decks, includes a gas cylinder, a holder for the cylinder, a pole to support the holder and a burner for producing a stable, visible flame. The burner includes one or more holes for injecting primary air near a flow-controlled gas orifice and a burn tip spaced from the orifice. A bowl is mounted about the burn tip and is preferably shaped for providing wind resistance and admitting secondary air at its exit to produce a stable, visible flame. In the preferred embodiment, the enclosure is made from plastic, and has a socket for receiving the pole. An oil, such as citronella oil, may be mixed with the propane or other gas in the cylinder to scent the area in which the torch is used.

19 Claims, 4 Drawing Sheets

TORCH

CROSS-REFERENCES TO RELATED APPLICATIONS, IF ANY

None.

BACKGROUND OF THE INVENTION

1. Field of the Invention

The present invention relates generally to the art of burners and torches, and more particularly to a torch which may be used in recreational environments such as with patios, decks or the like. Still more specifically, the present invention relates to a torch including a gas burner having gas flow and air control for producing a visible, stable flame.

2. Description of the Prior Art

Many types of torches and burners are known for mixing air and gas to produce a flame for a variety of applications such as welding, cooking, illumination and the like. For some applications, a visible flame is desired, independent of the heat output of the flame.

An example of the latter is the Olympic Torch. To produce such flames, less air is typically used than for heating burners, resulting in a cooler, but more visible, yellow flame. However, when such torches are employed outside, they tend to extinguish in adverse weather conditions, such as with high winds. An example of an application in which the problem is particularly pronounced is with the small, handheld Olympic Torches carried by runners across the United States in 1996 before the Olympic Games in Atlanta. Torches with gas cylinders were used for such application. The initial "burner design" for the Olympic Torch included a complex and expensive secondary burner arrangement prepared from copper tubing, with multiple precisely defined orifices, coiled around a primary burner. This proposed Olympic relay torch is illustrated in a drawing dated Jun. 6, 1995 and submitted to the United States Patent and Trademark Office with this application. The burner was prepared on behalf of the Atlanta Committee for the Olympic Games by the College of Industrial Design and Architecture of the Georgia Institute of Technology.

While this burner provided an efficient torch and achieved the purpose intended, the product was quite expensive and ill-suited for use in recreational applications where both reliability and low cost are required.

One solution recently proposed by the inventors of the present application is described in greater detail later. This torch used a burner which included a gas inlet with gas-flow control and a primary air hole located in the vicinity of a gas orifice. The design also included a sintered filter flame holder, an inner cup, and an outer cup with inner cup air holes for flame stability. In addition, a wire mesh flame holder mounted on the inner cup also helped to keep the flame lit. This design was useful and represented a significantly less complex design but still did not meet the low cost and manufacturability requirements demanded by the mass retail market.

A burner which is low in manufacturing costs, reliable, attractive and which produces a stable, visible flame over an extended period of time would be a significant improvement in the art.

While torches using bottled gas as the fuel supply are known, as indicated above, the present inventors are not aware of any attempt to use a gas cylinder in a recreational patio or deck torch in which the cylinder may be supported above the ground, a deck or a table top. Although liquid fuel patio or deck burners have become increasingly common in recent years, they are relatively more difficult to use because they require periodic refilling and wick maintenance. A torch which could be used in a patio or deck environment, or for similar applications, and which employs a replaceable cylinder of fuel gas, rather than liquid fuel, would also represent an advance in this art.

Furthermore, citronella has been added to a wide variety of products in recent years, including candles, fuel oils, insect sprays and the like. While there is some debate as to the effectiveness of citronella as an insect repellent, some people believe that it is at least partly effective in reducing insects in the area in which the citronella product is used. In addition, citronella has a characteristic smell which many find to be pleasing. To date, and to the knowledge of the present inventors, no one has prepared a mixture of citronella oil and fuel gas in gas cylinders. The addition of citronella oil to propane or other gases in a gas cylinder would result in yet a further advance in this art.

SUMMARY OF THE INVENTION

The present invention features a torch which may be used in patio, deck or other recreational applications and which uses a gas cylinder and a burner to produce a visible, stable flame.

Another feature of the present invention is a torch design which is aesthetically pleasing and which includes a burner for maintaining a flame even in high wind conditions.

A different feature of the present invention is a system for mounting a gas cylinder and a burner above the surface of a deck, patio or the like. The mounting system may include an elongate support element such as a pole or rod. Another aspect of this feature of the invention is the use of a decorative enclosure for concealing the gas cylinder and for coupling it to the mounting system.

A still further feature of the present invention is the preparation of a mixture of fuel gas and citronella oil to provide a "citronella effect" in the area in which the torch is used.

How these and other features of the present invention are accomplished will be described in the following detailed description of the preferred embodiment, taken in conjunction with the figures. Generally, however, the features are provided by a torch which includes a gas-flow controlled orifice, a burn tube surrounding the orifice and having air holes in the general vicinity of the orifice. A burn tip is spaced from the orifice and opens into a cup, where secondary air is mixed with the gas to provide a visible, wind-resistant, lazy flame. In the preferred and illustrated embodiment, the burn tube is surrounded by another tube creating the aesthetic appearance of a hand-held torch. Also in the preferred and illustrated embodiment, the gas supply is a cylinder of bottled gas which is concealed in an outer enclosure for decorative and protective purposes. The enclosure preferably includes a socket for receiving an elongate support member, such as a rod or pole. When the pole is secured in the socket, the burner and cylinder may be located above the ground, deck, or other surface where the torch is used. Another way in which the features of the present invention are accomplished is by providing a mixture of citronella oil and gas in the gas cylinder. For example, citronella oil may be mixed with propane gas to provide a "citronella effect" in the area around the torch. Other ways in which the features of the invention may be accomplished will appear to those skilled in art after reading the detailed description. These alternatives are deemed to fall within the scope of the present invention, if they are covered by the scope of the claims presented below.

DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENT

Before proceeding to the detailed description of the preferred embodiment, several general comments can be made about the applicability and the scope of the invention. First, the preferred embodiment shows the torch supported on a pole for elevating the torch above the surface of a patio, deck, table top or the like. The invention resides partially in the combination of such pole and torch, but also in the torch itself and its ability to produce a stable, visible flame. Second, the particular type of gas cylinder enclosure is not a critical feature of the present invention, and it may be variously embodied. The preferred enclosure has functional attributes which make it particularly well suited for use in combination with the pole, gas cylinder and burner, but other types of enclosures may be employed, both for protective and aesthetic purposes.

Another feature of the invention is the use of a propane gas mixed with citronella oil. However, other fuel gases may be employed, such as Mapp gas, butane, and propane and butane gas mixtures. These gases may be used either with or without a material which adds a scent to the surroundings when the torch is ignited.

The dimensions of the preferred embodiment are referred to in the detailed description, but the size of the torch may be widely varied. For example, the preferred and illustrated embodiment is designed to be used with standard, 400 gram propane cylinders generally available and used for home repair, camping, welding and other applications. Other sizes of fuel containers may also be used with the burner components of the present invention.

Figure 1:
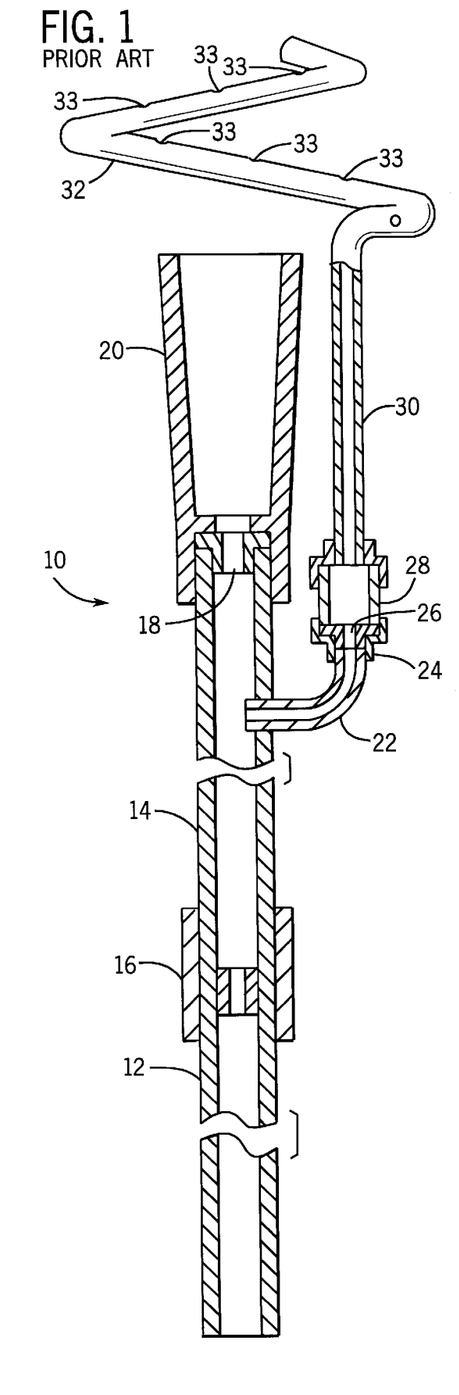
FIG. 1 is a side view partially in section of the aforementioned gas torch prepared for the Atlanta Committee for the Olympic Games.

Before proceeding to the detailed description of the preferred embodiment, reference is first made to FIG. 1 wherein a torch 10 described in the "Background" section of this specification is shown. Torch 10 includes lower and upper brass tubes, 12 and 14 respectively, coupled end to end by a threaded connector 16. Upper brass tube 14, has a gas orifice 18 at its outlet end and a gradually, outwardly expanding cone 20 which extends beyond the orifice 18. Just below orifice 18, a branch tube 22 leads to a reducer 24, a second orifice 26, an expanded tube section 28 and another reduced diameter burn tube section 30 extending generally parallel to the axis of cone 20. Above the level of the upper end of cone 20, burn tube 30 is coiled in a "pig's tail" fashion as shown generally by reference number 32. A plurality of gas openings 33, such as 6–8 gas openings, are provided in section 32. Gas openings 33 surround the axis of cone 20 but are spaced above cone 20.

As can be seen from FIG. 1, torch 10 is complex, requiring precision gas couplings, time consuming manufacture and the like.

Figure 2:
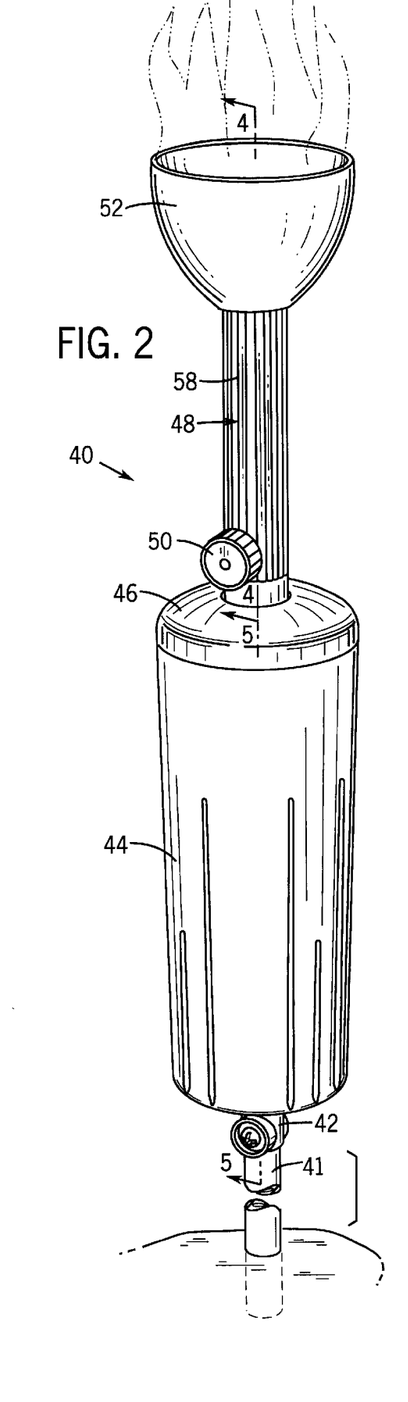
FIG. 2 is a perspective view of the torch of the present invention, showing only a portion of the length of the support pole.

Proceeding now to a description of the present invention, FIG. 2 illustrates a perspective view of a torch 40. Torch 40 includes a support pole 41, which is shown cut away in the drawing. The length of pole 41 may be widely varied and does not, in and of itself, form part of the present invention. Pole 41 is coupled by a fastener (described later) to a socket 42 at one end of a generally cylindrical, but slightly tapered, gas cylinder enclosure 44. At the end of the enclosure 44 opposite socket 42, a cap 46 is provided through which a threaded male coupling of a gas cylinder 54 (FIG. 3) protrudes. A burner assembly, shown generally at 48, is coupled to gas cylinder 54 and includes a gas flow control knob 50. Knob 50 regulates an internal valve 56 (FIG. 4) to control the amount of gas introduced from the cylinder into burner assembly 48. Torch 40 also includes a generally semi-spherical cup 52 provided at the top of burner assembly 48. Details concerning enclosure 44, burner assembly 48 and cup 52 will be provided in the following sections of this specification.

Figure 3:
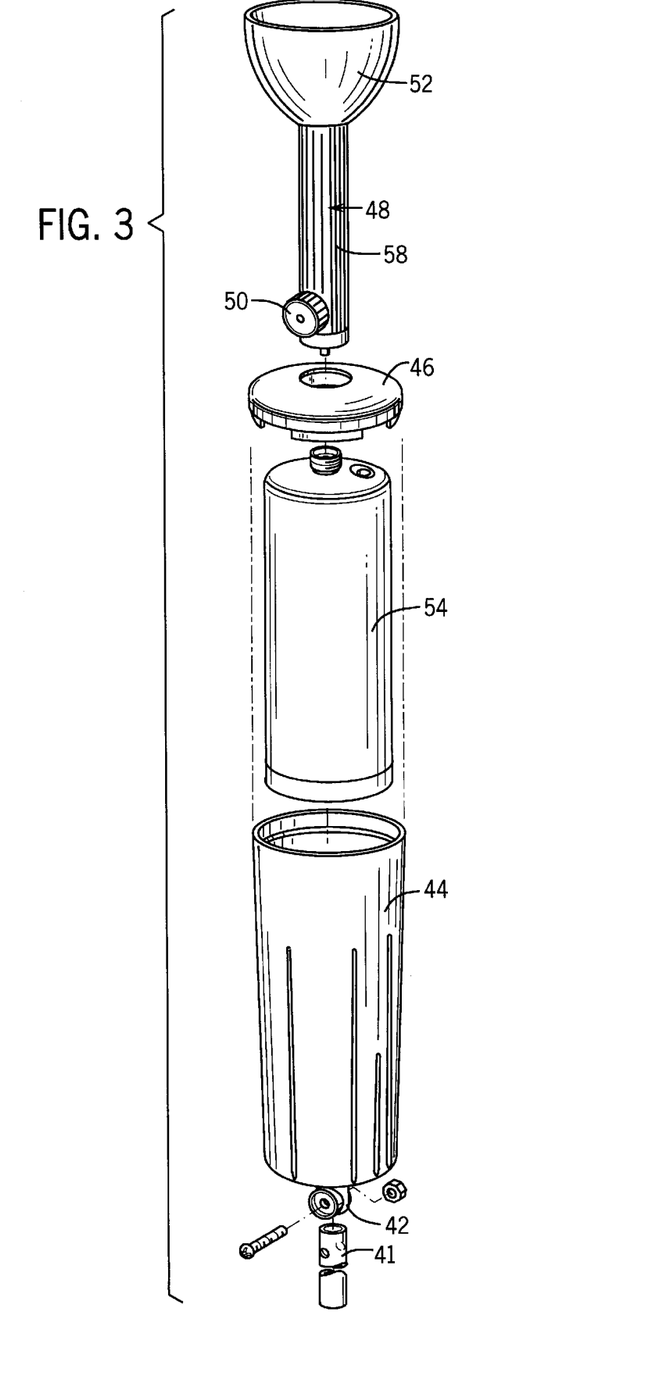
FIG. 3 is an exploded perspective view showing in general form the cylinder holder, a gas cylinder and the burner components of the preferred embodiment of the present invention.

FIG. 3 shows in exploded form the principal components of the present invention, including gas cylinder enclosure 44, gas cylinder 54, cap 46, burner assembly 48 and cup 52. Cylinder 54 is a commonly available gas cylinder containing fuel gas. While the preferred embodiment of the invention employs a 400 gram propane cylinder, cylinders of other sizes and different gases may also be used. Enclosure 44 is sized so that the end of gas cylinder 54 opposite the gas outlet will fit snugly therein, forming a friction fit. This arrangement facilitates tightening of burner assembly 48 to gas cylinder 54.

Figures 4, 6:
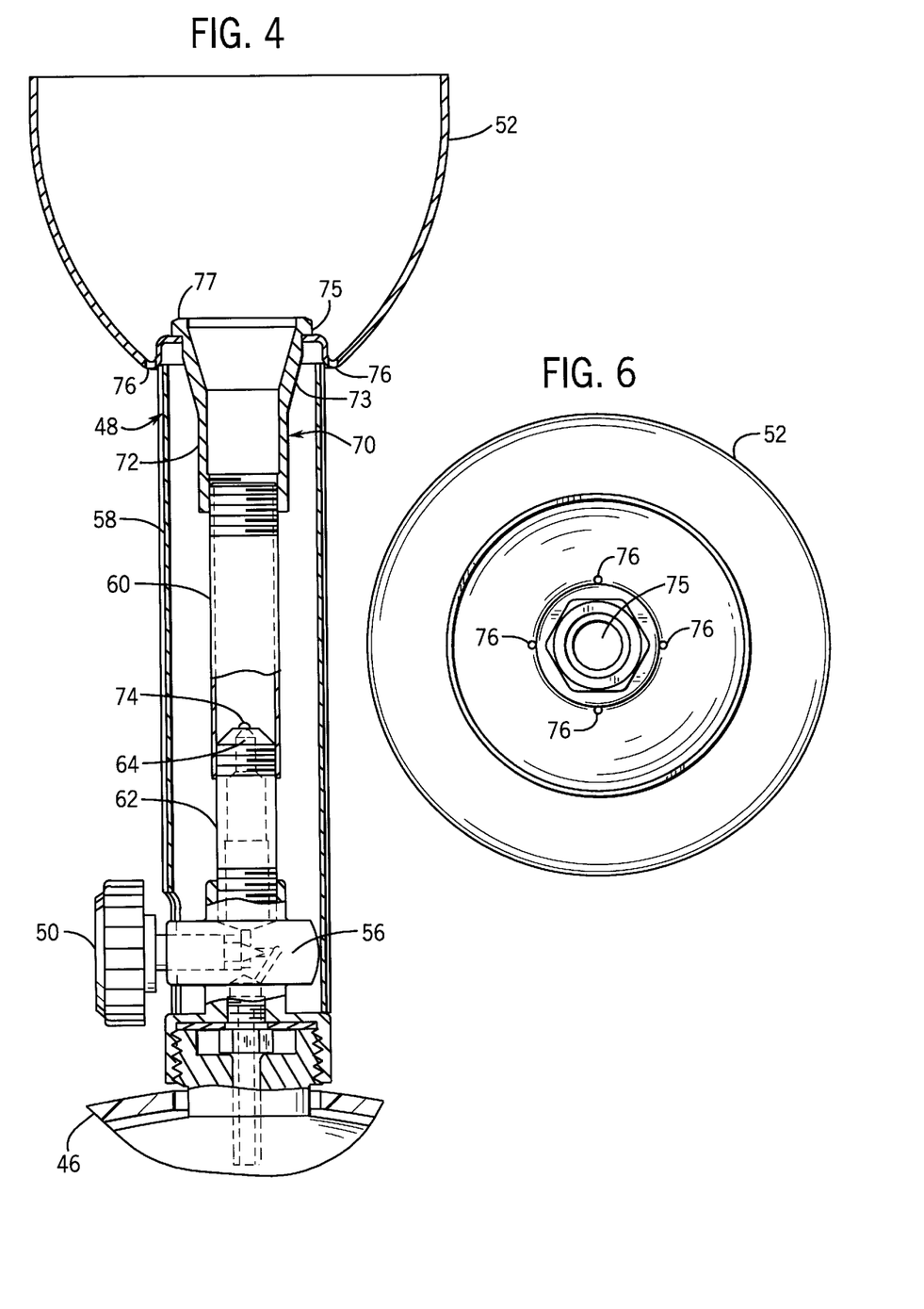
FIG. 4 is a sectional view of the burner components of the torch of the preferred embodiment of the present invention taken generally along line 4—4 of FIG. 2.
FIG. 6 is an end view of the bowl used in the torch of the preferred embodiment of the present invention.

Burner assembly 48 of torch 40 is shown in greater detail in FIG. 4. Burner assembly 48 includes knob 50 which controls gas valve 56. Gas valve 56 is a standard valve of known construction and has been used on various devices, such as soldering torches manufactured by the assignee of the present invention. Burner assembly 48 also includes an outer, decorative, generally cylindrical tube 58 and an inner cylindrical burn tube 60. Burn tube 60 is located co-axially within outer tube 58 and is threadingly attached to the upper end of outlet gas orifice tube 62 which, in turn, is coupled to valve 56. A gas orifice 64 is located at the upper end of outlet gas orifice tube 62, at a location lying within, but generally proximate, the lower end of burn tube 60.

In the preferred embodiment, burn tube 60 is approximately 2 inches in length and approximately 0.5 inch in diameter with gas orifice 64 located approximately 0.365 inch from the inlet end of burn tube 60. Orifice 64 should have a diameter of approximately 0.16 mm. Burn tube 60 is preferably made of stainless steel which acts as an insulator (when compared to brass) to prevent heat from returning to valve 56. However, burn tube 60 may also be made of other materials such as brass.

Burn tube 60 has an outlet which is coupled to a burn tip 70. Burn tip 70 has a lower cylindrical end 72 which threadingly engages the outlet of burn tube 60 and a conically-shaped upper end 73. Burn tip 70, in the preferred embodiment, is made of brass and is approximately 1.36 inches in overall length.

A pair of small, primary air holes 74 are provided in burn tube 60. Primary air holes 74 are spaced approximately 180° from one another, and in the preferred embodiment, each has a diameter of 0.078 inch. The provision of the small, primary air holes is a significant feature of the invention and contributes to the creation of a stable, visible flame. By restricting the size of primary air holes 74, the amount of air reaching cup 52 is less than that required for an efficient, hot, blue flame. The yellow flame which results from the burning of gas in a "starved" condition is desirable in this particular invention.

Attached at the upper end of burner assembly 48 is cup 52. Cup 52 is preferably made of soft brass and is semi-spherical in shape. Cup 52 has a base and an outer rim. The outer rim of cup 52 preferably has a diameter of approximately 3.0 inches. The base of cup 52 has a central opening 75 for receiving burn tip 70. In the preferred embodiment, the depth of cup 52 from the outer, upper rim to the base is approximately 2 inches. Located in the base around opening 75 are four small holes 76 (FIG. 6). In the preferred embodiment, central opening 75 has a diameter of 0.840 inch, and holes 76 have a diameter of 0.063 inch. Holes 76 serve dual functions. First, holes 76 allow rain, which may be captured in the cup 52 during use of the torch 40, to drain from cup 52. Second, holes 76 enhance the burn characteristics of torch 40, by supplying a small additional amount of air to the flame. The outlet 77 of burn tip 70 is spaced above the level of holes 76 by approximately 0.25 inch. Cup 52 is secured onto burn tip 70 by a hexagonal nut.

Figure 5:
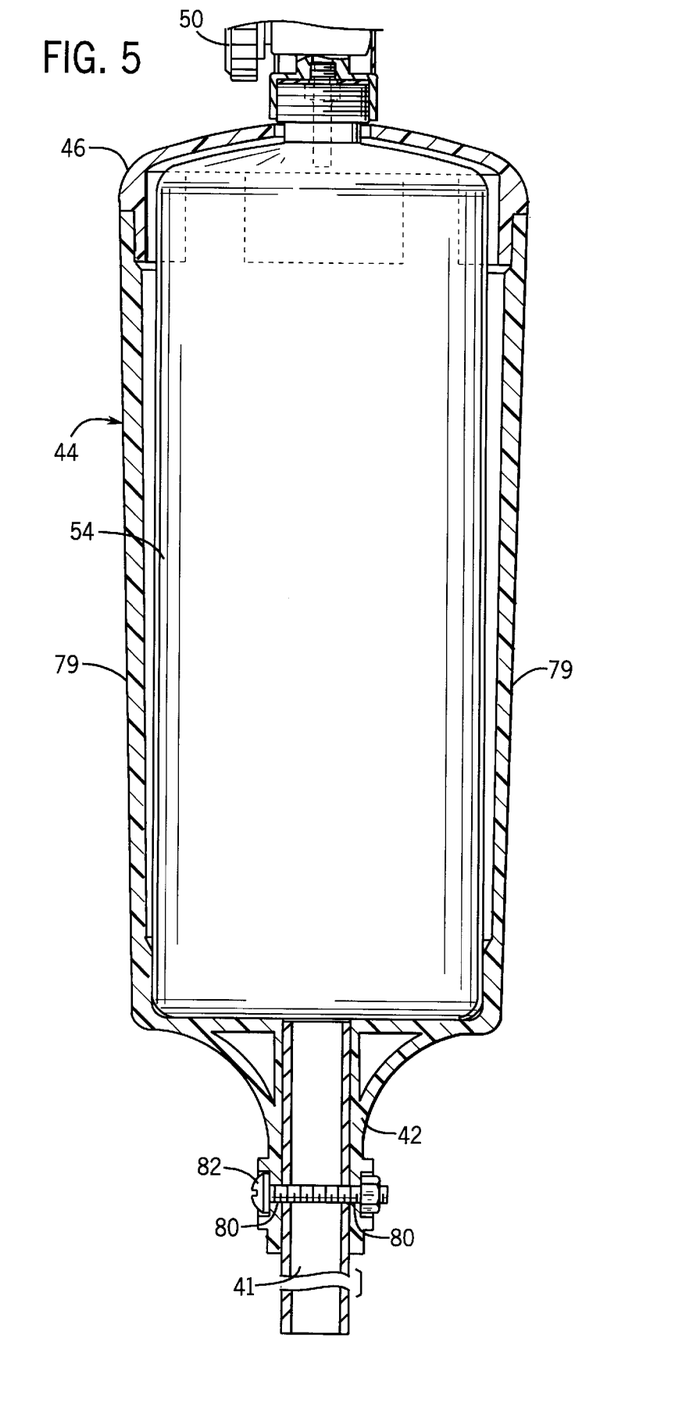
FIG. 5 is a cross-sectional view of the cylinder holder of the present invention taken generally along line 5—5 of FIG. 2.

Proceeding next to the description of FIG. 5, a cross-sectional view of gas cylinder enclosure 44 is shown. Enclosure 44 includes a tapered wall 79. Thus, in the preferred embodiment enclosure 44 has an inner diameter of approximately 2.82 inches at its smaller end and 2.98 inches at its larger end. This gradual taper allows a standard gas cylinder to be snugly received in the smaller end of enclosure 44, while permitting easy insertion through the larger end. Enclosure 44 is preferably made of a moldable plastic, such as API 550-11 manufactured by American Polymer Inc.

As discussed earlier, enclosure 44 also includes a cylindrical socket 42 for receiving an elongate support member, such as pole 41. Socket 42 includes a pair of through holes 80 for receiving a fastener 82, such as a screw, to secure pole 41 in place. One suitable diameter for socket 42 is 0.765 inch.

Thus, torch 40 operates as follows to produce a stable, wind-resistant, yellow flame. Valve 56 is first adjusted via knob 50 to supply gas from gas cylinder 56 to the burn tube 60 via orifice 64. Primary air enters through air holes 74 and mixes with the gas in burn tube 60. The gas/air mixture then travels through lower cylindrical end 72 of burn tip 70 and out of upper end 73. At that location, the mixture flows into cup 52 where it is mixed with a small additional amount of combustive air from holes 76. It is then ignited and mixed with secondary air at the upper end of cup 52 to create a stable, visible, yellow flame. Generally, to accomplish such a flame, the ratio of the area of orifice 64 to the area of primary air holes 74 should be between 0.002 and 0.004. In a typical non-regulated torch having a hotter, blue flame, this ratio ranges between 0.0001 and 0.0003.

The preferred fuels for use in the present invention are propane or Mapp gas. However, other gases such as butane or a mixture of butane and propane may also be used. These gases may readily be obtained in steel cylinders. In addition, the present inventors have found that a mixture of gas and citronella oil will produce a citronella effect when torch 40 is ignited. Preferably, the mixture should contain between 0.025% weight and 12.5% weight of citronella oil. Thus, for a standard, 400 gram propane cylinder, between 1 gram and 50 grams of citronella oil should be added. This citronella effect is believed by many people to reduce annoying insects, such as mosquitos. In addition, the citronella scent provides a picnic atmosphere, similar to that created by citronella candles and other citronella containing products currently available.

Figure 7:
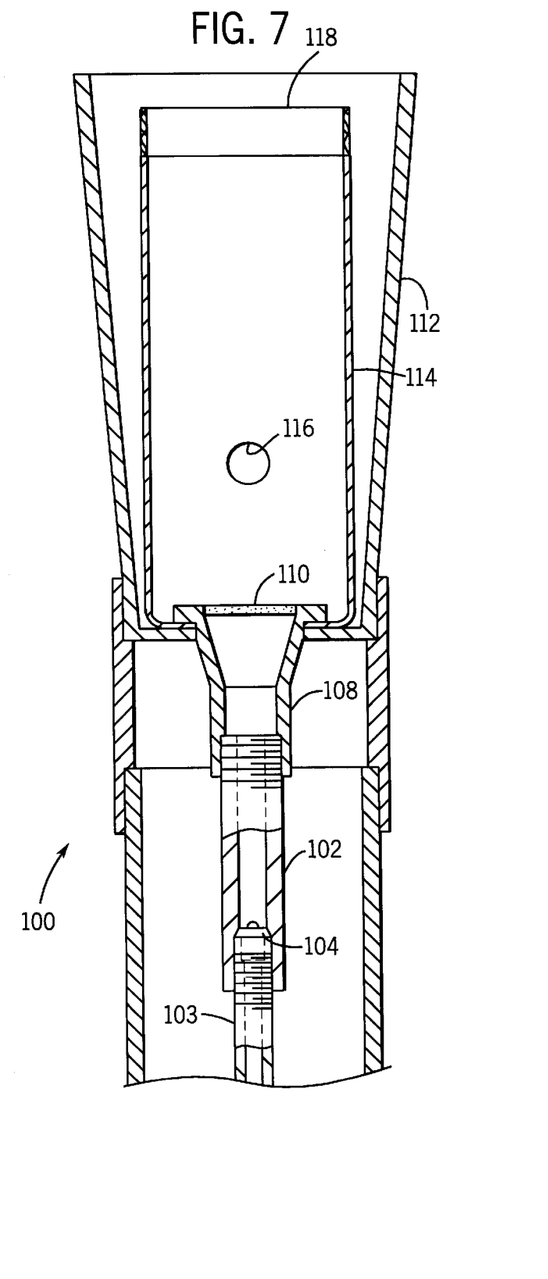
FIG. 7 is a sectional view of the Olympic Torch design illustrating the gas flow conduits and orifice, primary and secondary air holes, a sintered filter and a wire mesh.

Finally, reference is made to FIG. 7 to illustrate another gas torch 100 developed by the present inventors which produces a visible, stable flame. Torch 100 includes an inner burn tube 102 having a gas orifice 104 located near its inlet end. A gas conduit 103, such as from a gas cylinder, is connected to orifice 104. Burn tube 102 is threadingly coupled to a burn tip 108 and a sintered filter flame holder 110 caps the outlet of burn tip 108. It was believed by the inventors that such flame holder was required for the creation of the stable, visible flame. An outer, funnel shaped cup 112 was provided for decorative purposes, and a generally cylindrical inner cup 114 was provided for the gas/air mixture. A pair of air holes 116 were included for the inner cup 114 for flame stability, and a wire mesh 118, circular in shape, was secured over the outlet of the inner cup 114, to keep the flame lit under windy conditions.

As can be appreciated from the description of FIG. 7, torch 100 developed by the present inventors and shown, represented a dramatic simplification over the torch 10 described in connection with FIG. 1. Torch 100, however, is more complicated and more expensive to manufacture than torch 40.

While the preferred embodiment of the present invention has been described in connection with the FIGURES, the invention is more general and can be variously embodied by those skilled in the art after reading the present specification. For example, although torch 40 is shown having a pole 41 for supporting torch 40 above the ground or on a deck, a support such as those used for larger candles may be substituted for pole 41 to place torch 40 on a table top. In addition, although the preferred embodiment shows cup 52 as being semi-spherical in shape, cup 52 may also take on other configurations, such as that of a cone. Furthermore, cup 52, burn tip 70 and burn tube 60 need not be separate pieces. Rather, two or more of them may be formed as an integral unit.

Accordingly, the invention should not be limited to the illustrated embodiments, but should be limited solely by the scope of the claims which follow.

What is claimed is:

1. A torch for recreational use comprising:
   an orifice tube having a gas orifice and a valve for regulating a gas flowing through the gas orifice;
   a flame holding structure including a cup with a fully opened upper end and a second tube coupled to the cup and to the orifice tube including an end at said cup having an internal diameter larger than an internal diameter at an opposite end, the second tube having at least one primary air hole proximate the gas orifice for admitting into the flame holding structure only an amount of air sufficient to support combustion and to produce a stable, visible flame; and a gas source for supplying the gas to the orifice tube.

2. The torch of claim 1, wherein the gas orifice has a first area and the at least one primary air hole has a combined second area, the of the first area to the second are ranging between approximately 0.002 and 0.004.

3. The torch of claim 1, wherein the flame includes a burn tip, and wherein at least a portion of the burn tip extends into the cup.

4. The torch of claim 1, wherein the gas source is a gas cylinder.

5. The torch of claim 4, further comprising an enclosure for removably receiving the gas cylinder.

6. The torch of claim 5, further comprising a support member coupled to the enclosure for elevating the torch above a surface.

7. The torch of claim 6, wherein the support member is a pole.

8. The torch of claim 1, wherein the gas source includes a mixture of gas and citronella oil.

9. The torch of claim 8, wherein the mixture contains between 0.025% weight and 12.5% weight of citronella oil.

10. A torch for recreational use comprising:

a burner assembly including a burn tube coupled at a first end to a burn tip and at a second end to an orifice tube, the orifice tube having a gas orifice and a valve for regulating a gas flowing through the gas orifice, the burn tube having at least one primary air hole proximate the gas orifice for admitting into the burn tube an amount of air necessary to produce a stable, visible flame;

a cup coupled to the burn tube of the burner assembly at an inlet area and having an open end with an outer rim, the outer rim having a diameter substantially larger than a diameter of the inlet area, an outlet of said burn tube including a sintered flame holder at said inlet area; and a gas source coupled to the orifice tube for supplying the gas to the burner assembly.

11. The torch of claim 10, wherein the gas orifice has a first area and the at least one primary air hole has a combined second area, the ratio of the first area to the second area ranging between approximately 0.002 and 0.004.

12. The torch of claim 10, further comprising an enclosure for removably receiving the gas source.

13. The torch of claim 12, further comprising a support member mounted to the enclosure for elevating the torch above a surface.

14. The torch of claim 13, wherein the support member is a pole.

15. The torch of claim 10, wherein the cup includes a plurality of openings disposed around the inlet area for admitting into the cup an additional amount of air which, when added to the air entering the burn tube through the at least one primary air hole, will produce a stable, visible flame.

16. The torch of claim 10, wherein the burn tube is made of stainless steel.

17. The torch of claim 10, wherein the gas cylinder includes a mixture of gas and citronella oil.

18. The torch of claim 10, wherein at least a portion of the burn tube of the burner assembly extends into the cup.

19. A torch for recreational use comprising:

an orifice tube having a gas orifice and a valve for regulating a gas flowing through the gas orifice;

a flame holding structure coupled to the orifice tube and having a cup with a fully open upper end and a burn tube, the burn tube having at least one primary air hole proximate the gas orifice for admitting into the flame holding structure only an amount of air sufficient to support combustion and to produce a stable, visible flame, wherein the burn tube includes a burn tip coupled to the cup, the burn tip including an end having an internal diameter larger than an internal diameter of the burn tube, and wherein the gas orifice has a first area and the at least one primary air hole has a combined second area, the ratio of the first area to the second area ranging between approximately 0.002 and 0.004; and a gas source for supplying the gas to the orifice tube.

* * * * *

UNITED STATES PATENT AND TRADEMARK OFFICE
CERTIFICATE OF CORRECTION

PATENT NO. : 5,902,101
DATED : May 11, 1999
INVENTOR(S) : Roger Palmer, et al.

It is certified that error appears in the above-indentified patent and that said Letters Patent is hereby corrected as shown below:

In the Claim:

Claim 3, should read as follows:

--3. The torch of claim 1, wherein the second tube includes a burn tip and wherein at least a portion of the burn tip extends into the cup.--

Signed and Sealed this

Ninth Day of November, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,902,101
DATED      : May 11, 1999
INVENTOR(S): Palmer et al.

It is certified that error appears in the above-identified patent and that said Letters Patent is hereby corrected as shown below:

In the Claim:

Claim 2 should read as follows:

--2. The torch of claim 1, wherein the gas orifice has a first area and the at least one primary air hole has a combined second area, the ratio of the first area to the second area ranging between approximately 0.002 and 0.004.--

Signed and Sealed this

First Day of February, 2000

*Attest:*

*Attesting Officer*

Q. TODD DICKINSON

*Acting Commissioner of Patents and Trademarks*